(12) United States Patent
Howard et al.

(10) Patent No.: US 7,062,339 B2
(45) Date of Patent: Jun. 13, 2006

(54) METHOD AND APPARATUS FOR COMMUNICATING BETWEEN A PORTABLE DEVICE AND A SERVER

(75) Inventors: John K. Howard, Saratoga, CA (US); Dwayne Escola, Campbell, CA (US); Jim Pollock, San Jose, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 782 days.

(21) Appl. No.: 10/141,340

(22) Filed: May 9, 2002

(65) Prior Publication Data

US 2003/0212465 A1    Nov. 13, 2003

(51) Int. Cl.
  *G10L 21/00* (2006.01)
  *G10L 11/00* (2006.01)
  *G06F 17/00* (2006.01)

(52) U.S. Cl. .......................................... 700/94; 704/270
(58) Field of Classification Search ................. 700/94; 704/270; 235/379, 380; 455/419; 345/82; 340/5.92
  See application file for complete search history.

(56) References Cited

U.S. PATENT DOCUMENTS

| | | | |
|---|---|---|---|
| 4,634,845 A | * | 1/1987 | Hale et al. .................. 235/380 |
| 6,144,848 A | * | 11/2000 | Walsh et al. ................ 455/419 |
| 6,230,970 B1 | * | 5/2001 | Walsh et al. ................ 235/379 |
| 6,366,267 B1 | * | 4/2002 | Song et al. ................... 345/82 |
| 6,745,937 B1 | * | 6/2004 | Walsh et al. ................ 235/379 |
| 6,853,293 B1 | * | 2/2005 | Swartz et al. .............. 340/5.92 |
| 6,973,574 B1 | * | 12/2005 | Mihcak et al. ............. 704/270 |
| 2001/0041980 A1 | * | 11/2001 | Howard et al. ............. 704/270 |

FOREIGN PATENT DOCUMENTS

EP    001050793 A2 *  11/2000

* cited by examiner

*Primary Examiner*—Salvatore Cangialosi
(74) *Attorney, Agent, or Firm*—McDermott Will & Emery LLP

(57) ABSTRACT

A control system including a portable device and a server. The portable device includes: (1) a body; (2) a microphone for receiving a first audio data; (3) an audio coder for converting the first audio data to first audio data signals; (4) an optical sensor for reading a first optical data; (5) an optical coder for converting the first optical data to first optical data signals; and (6) a transmitter for transmitting at least the first audio data signals or the first optical data signals to the server. The server includes: (1) a communication device for receiving at least first audio data signals or the first optical data signals transmitted by the transmitter; (2) a data analyzer for extracting semantic information from the first audio data signal and for converting the semantic information into an audio command; (3) an optical analyzer for converting the first optical data to an optical command; (4) a memory device for storing programs to be performed; and (5) a CPU for receiving the audio command and the optical command, retrieving a program associated with the audio command or the optical command and for executing the retrieved program.

21 Claims, 15 Drawing Sheets

METHOD AND APPARATUS FOR COMMUNICATING BETWEEN A PORTABLE DEVICE AND A SERVER

FIELD OF THE INVENTION

The present invention relates generally to a portable device for communicating with a computer server, especially a home server, which provides for and/or controls various activities in a home, including for example, home appliances, purchasing of goods, etc. The present invention also relates to a method and system, which includes the portable device and server, for controlling such home activities.

BACKGROUND OF THE INVENTION

Increasingly, homes appliances are being connected together and controlled via a home network, which typically take different forms ranging from a simple network hub device to a more complex hub and switching system with broadband connection to the Internet. Utilizing the home gateway, it is possible to control a wide variety of activities/components within a home. For example, these activities/components include various entertainment network devices, such as TV, stereo, and video equipment. In addition, homes usually have various "life support systems", such as, heating systems, air conditioning systems and lighting and security systems. These life support systems can also be connected to the home gateway and controlled via the home gateway.

Currently, known home gateways typically comprise a computer (i.e., PC) so as to allow an operator to control the systems coupled to the network. Thus, as a prerequisite for utilizing the home gateway and controlling various home related activities, it is necessary for the user to be able to operate a personal computer (PC). However, for many people, using a PC with a keyboard or mouse is cumbersome and difficult. Moreover, the PC is often placed in a location isolated from the main living quarters, and is therefore not readily accessible by the user. As such, the likelihood that the user will fully utilize the home gateway to program and control home activities is minimal.

As such, there is exists a need for a method and system that will allow the user to easily and readily control home activities without having to directly interface with or use a PC. In addition, there is a need for a system which readily allows the user to program and control the home gateway from essentially any area of the home without having to access a PC.

SUMMARY OF THE INVENTION

Accordingly, the present invention relates to a method and system that allows an operator to easily and readily control home activities without having to directly interface with or use a PC, and which allows the operator to program and control the home gateway from essentially any area of the home without having to access a PC. In each of the embodiments described below, the control system of the present invention includes a portable device readily carried by the operator that can be utilized to communicate with a server located at a fixed location. Utilizing the portable device, the operator can program and control various components and activities.

In one embodiment of the present invention, the control system includes a portable device and a server, where the portable device includes: (1) a body; (2) a microphone for receiving first audio data; (3) an audio coder for converting the first audio data to first audio data signals; (4) an optical sensor for reading first optical data; (5) an optical coder for converting the first optical data to first optical data signals; and (6) a transmitter for transmitting at least the first audio data signals or the first optical data signals to the server. The server includes: (1) a communication device for receiving at least the first audio data signals or the first optical data signals transmitted by the transmitter; (2) a data analyzer for extracting semantic information from the first audio data signal and for converting the semantic information into an audio command; (3) an optical analyzer for converting the first optical data to an optical command; (4) a memory device for storing programs to be performed; and (5) a CPU for receiving the audio command and the optical command, retrieving a program associated with the audio command or the optical command and for executing the retrieved program.

As described in further detail below, the present invention provides significant advantages over the prior art. Most importantly, the control system of the present invention allows an operator to easily and readily control home activities without having to directly interface with or use a PC, and which allows the operator to program and control the home gateway from essentially any area of the home without having to access a PC.

Additional advantages of the present invention will become apparent to those skilled in the art from the following detailed description of exemplary embodiments of the present invention.

The invention itself, together with further objects and advantages, can be better understood by reference to the following detailed description and the accompanying drawings.

DETAILED DESCRIPTION OF THE INVENTION

The following detailed description relates to a novel portable device for use with a computer/server, which allows an operator to control various activities within a home. The description sets forth numerous specific details regarding the configuration of the portable device, as well as numerous examples of types of applications that the portable device can be utilized to accomplish. It will be obvious, however, to one skilled in the art that these specific details need not be employed to practice the present invention. Clearly, other configurations of the portable device and additional applications and uses thereof are possible.

Figure 1A:
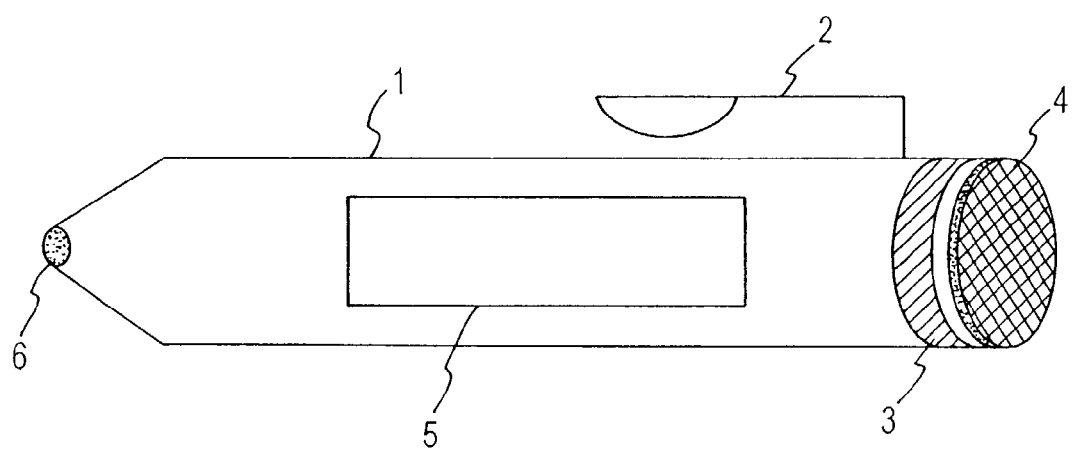
FIG. 1(a) illustrates a first exemplary configuration of a portable device utilized in conjunction with the present invention.

FIG. 1(a) illustrates a first exemplary configuration of a portable device 10 of the present invention, which as explained below, allows a user to easily and conveniently interface with the home gateway, thereby allowing the user to easily control a wide range of activities within the home. Referring to FIG. 1(a), as shown therein, the portable device 10 has a body 1 having a shape of a ballpoint pen. The portable device 10 comprises a clip 2, a microphone 3, a speaker 4, a display device 5, and an optical sensor 6. The clip 2 is disposed on the side of the body 1 and functions to clip the portable device 10 to, for example, the shirt pocket of the user. The microphone 3 and speaker 4 are preferably positioned on the same end of the portable device 10 as the clip 2. As such, when a user carries the portable device 10 in the shirt pocket, the microphone 3 and speaker 4 are exposed from the pocket. The display device 5, for example an LCD device, is placed in the center portion of the portable device 10. The optical sensor 6, for instance a CCD, is placed at the end of the portable device 10 opposite the end having the microphone 3 and speaker 4. The portable device 10 further comprises a battery (not shown) for providing power to foregoing components of the portable device. Finally, the portable device 10 also comprises a controller (not shown in FIG. 1(a)) which functions to control the operation of the foregoing components, and an antenna (also not shown in FIG. 1(a)) which functions to allow for wireless communication between the portable device 10 and a server 200 forming part of the home gateway. In one embodiment, the antenna is incorporated into the design of the clip 2.

It is noted that the configuration of the portable device 10 illustrated in FIG. 1(a) is merely one example of a possible configuration. Various other configurations, which change the overall shape of the device and the relative position of the components, are clearly possible.

Figure 1B:
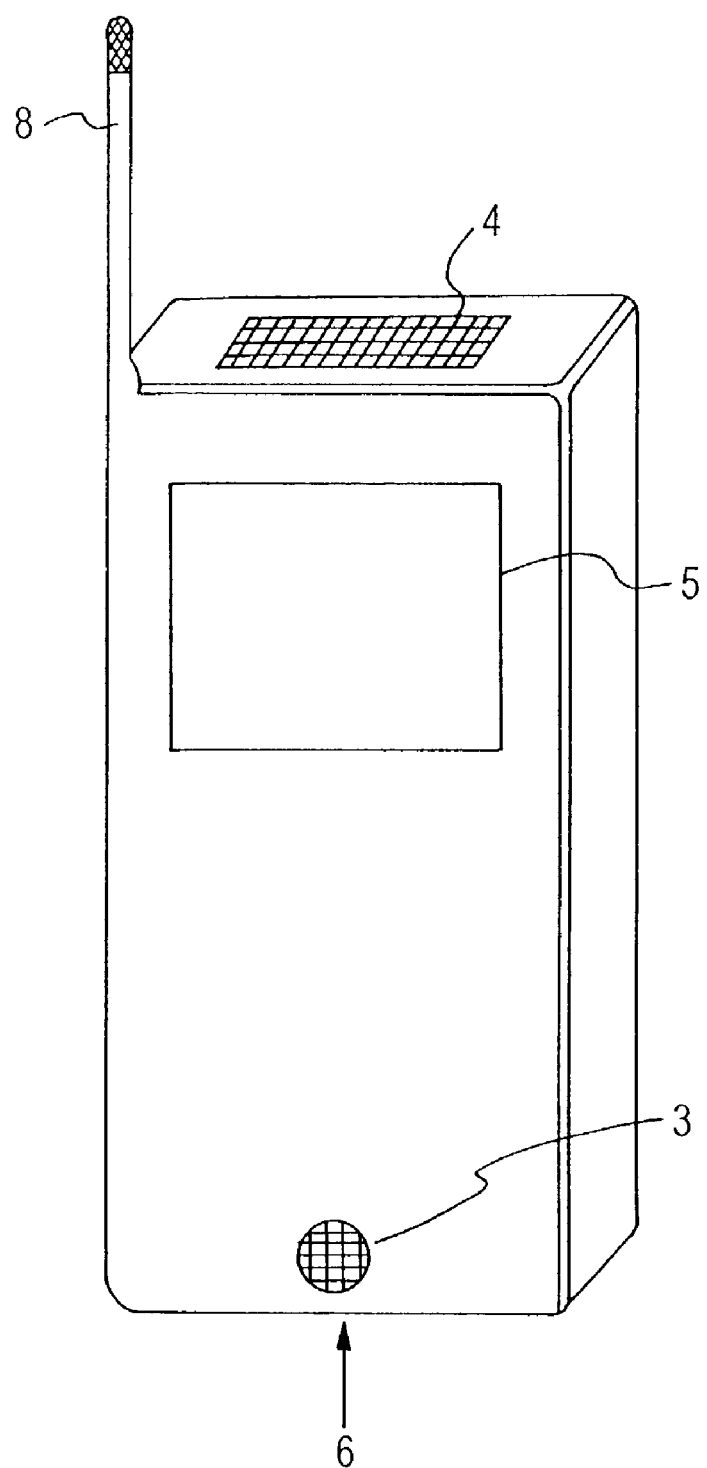
FIG. 1(b) illustrates a second exemplary configuration of a portable device utilized in conjunction with the present invention.

One possible alternative is to form the portable device such that the body 1 has the shape of cellular phone and the components are configured relative to one another as shown in FIG. 1(b). As shown therein, speaker 4 is positioned on an upper surface of the body 1, the display device 5 is positioned on the upper portion of the front surface of the body 1, the microphone 3 is positioned on the lower portion of the front surface of the body 1, and the optical sensor 6 is positioned on a bottom surface of the body 1. Also, the antenna 8 can be located in the same position as normally placed in a cellular phone. It is noted that both FIGS. 1(a) and 1(b) are intended to illustrate examples of the relative locations and configurations of the "user interactive" components contained in the portable device 10.

Figure 2:
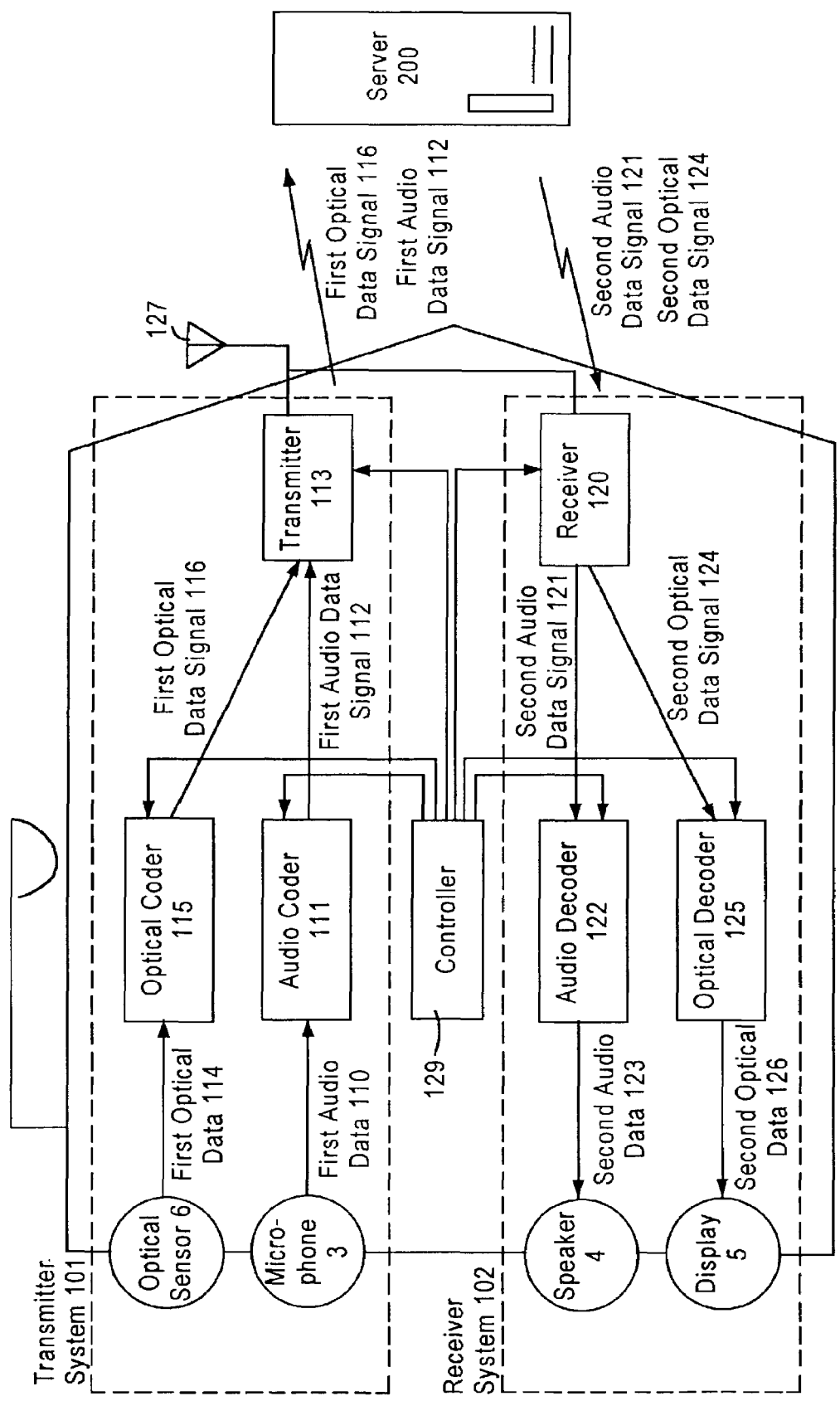
FIG. 2 is a block diagram illustrating a first exemplary embodiment of the portable device of the present invention.

FIG. 2 is a block diagram illustrating a first exemplary embodiment of a portable device of the present invention. As shown in FIG. 2, the portable device 10 comprises both a transmitter system 101 and a receiver system 102. It is noted however, that in one variation, it is possible to provide the portable device 10 only with the transmitter system 101. Such a system is advantageous in certain circumstances as it provides a reduction in overall power requirements and power dissipation requirements.

Referring again to FIG. 2, the transmitter system 101 includes the microphone 3, which functions to receive audio data 110, which is usually human voice or speech. The microphone 3 is coupled to an audio coder 111 (e.g., CODEC) and outputs the audio data 110 to the audio coder 111. The audio coder 111 functions to packet/code or convert the audio data 110 to modulated audio data signals 112, which are suitable for wireless transmission to the server 200. Examples of acceptable modulation schemes to be implemented by the audio coder 111 include, but are not limited to sigma delta code, PCM, etc. The audio coder 111 is coupled to a transmitter 113, which functions to receive modulated audio data signals 112 from the audio coder 111 and to transmit the modulated audio data signals to the server 200 via an antenna 127.

The transmitter system 101 also includes the optical sensor 6 for detecting optical data 114, which is for instance text data or bar code data. A CCD is one example of a possible optical sensor 6 that can be utilized in the transmitter system 101. Another example is a CMOS sensor. The output of the optical sensor 6 is coupled to the input of an optical coder 115. Similar to the audio coder 111, the optical coder 115 packets/codes or converts the optical data 114 to modulated optical data signals 116, which are suitable for wireless transmission to the server 200. The output of the optical coder 115 is also coupled to the transmitter 113. Similar to the modulated audio signals, the transmitter 113 also functions to transmit the modulated optical data signals 116 to the server 200 via the antenna 127.

The receiver system 102 comprises a receiver 120 for receiving incoming audio data signals 121 and/or incoming optical data signals 124, which are transmitted by the server 200 and coupled to the receiver 120 via antenna 127. In the event an audio signal is transmitted by the server 200, the receiver 120 couples the audio data signal 121 to an audio decoder 122, which functions to unpacket/decode or convert the audio signals 121 to audio data 123. The output of the audio decoder 122 is coupled to the speaker 4, which functions to output the audio data 123.

In the event an optical signal is transmitted by the server 200, the receiver 120 couples the optical data signal 124 to an optical decoder 125, which functions to unpacket/decode or convert the optical data signals 124 to optical data 126. The output of the optical decoder 125 is coupled to the display device 5, which functions to display the optical data 126 as visible text or graphics.

It is further noted that the portable device 10 further comprises a controller 129 coupled to the optical coder 115, the audio coder 111 and the transmitter 113 of the transmitter system 101, as well as the optical decoder 125, the audio decoder 122 and the receiver 120 of the receiver system 102 so as to control the operation and scheduling of operations of each of these components. In the given embodiment the controller 129 includes a CPU device, which is programmable so as to allow for control of the foregoing components. However, it is also possible that the controller 129 comprises a state machine (i.e., logic only circuit, no processor) for controlling the scheduling and operation of the components of the transmitter system 101 and the receiver system 102.

In accordance with the first embodiment of the present invention, as explained below, the analysis for the optical data signals 116 and the audio data signals 112 are performed by components contained in the server 200. Thus, the portable device 10 does not have to include complex circuitry capable of analyzing the optical data signals 116 and the audio data signals 112. As a result, the amount of power consumption by the portable device 10 is minimized, and the operating life of the portable device between battery charges is maximized. It is noted that while not shown, in the preferred embodiment, the portable device 10 comprises a rechargeable battery as its power source.

It is further noted that in one embodiment of the present invention, the transmitter 113, receiver 120, audio coder 111, optical coder 115, audio decoder 122 and the optical decoder 125 utilize the same data communication/transfer techniques as utilized for data transmission in cellular phones and pagers. In addition, the data and the control signals utilized to control the components coupled to the home network can be packetized and transmitted utilizing known schemes, such as BlueTooth, which is the IEEE 802.15.1 standard for wireless personal area networks.

Figure 3:
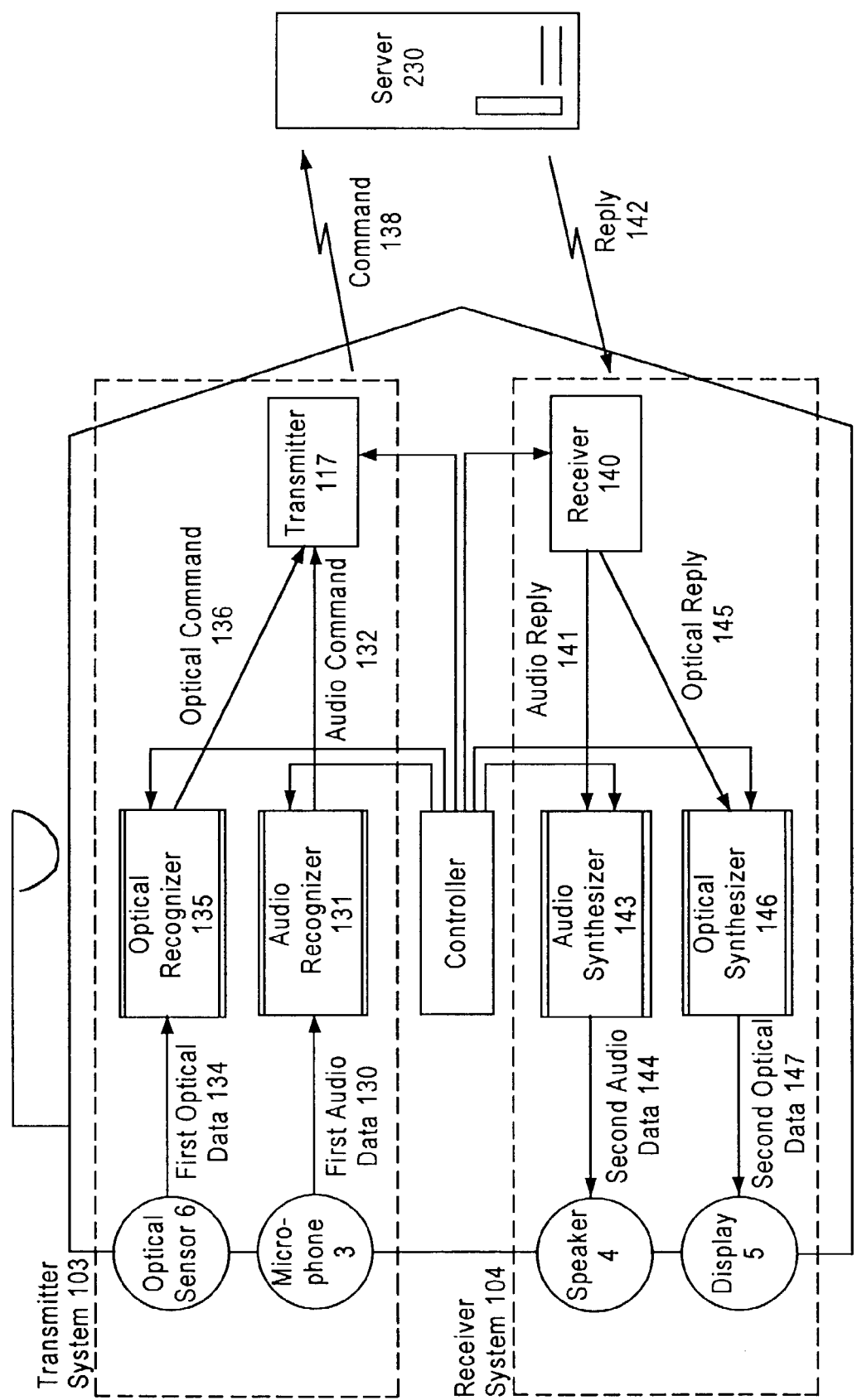
FIG. 3 is a block diagram illustrating a second exemplary embodiment of the portable device of the present invention.

A second embodiment of the portable device 10 of the present invention is illustrated in FIG. 3. The portable device 10 of this embodiment has substantially the same configuration as the portable device illustrated in FIG. 2, with the following exceptions. First, the transmitter system 103 of the portable device 10 of the second embodiment has an optical analyzer 135 and an audio analyzer 131 instead of the optical coder 115 and the audio coder 111. Similarly, the receiver system 104 has an optical synthesizer 146 and an audio synthesizer 143 instead of the optical decoder 125 and the audio decoder 122. In accordance with this embodiment, the optical analyzer 135 and the audio analyzer 131 have the capability of receiving and analyzing the respective optical and audio data input from the optical sensor 6 and the microphone 3 and, as explained below, of generating commands on the basis of the given input data, which are then transmitted to the server 230 via the transmitter 137. Upon receipt of the commands generated by the optical analyzer 135 and the audio analyzer 131, the server 230 functions to carry out the command. Similarly, the optical synthesizer 146 and audio synthesizer 143 are also capable of processing incoming commands from the server 230, so as to produce the corresponding audio data 144 and the corresponding optical data 147, which are transmitted to the speaker 4 and display device 5 for reproduction.

As explained in more detail below, the system of the present invention utilizes the data input via the portable device 10 to generate commands that are utilized to control various activities and functions. For example, the system utilizes known speech recognition and synthesis systems, as described in U.S. patent application Ser. Nos. 09/383,758 and 09/875,740, which are hereby incorporated by reference, to convert speech data generated by an operator and input into the portable device 10 into commands that can be processed by a computer (i.e., home gateway). In the embodiment of FIG. 2, data input by the operator is transmitted to the server 200 and is then analyzed and converted into a corresponding command (details regarding how the command is generated is set forth below), which identify a corresponding application to be executed by the server in order to accomplish the operator's desired objective.

Alternatively, in the embodiment of FIG. 3, data is analyzed in the portable device 10 and the corresponding command is generated by the portable device 10, and then the command is transferred to the server 230. In other words, in the embodiment of FIG. 3, analysis of the optical data 134 and the audio data 130 input by the operator is assigned to the portable device 10. Accordingly, in this embodiment, as the portable device 10 only sends the optical commands 136 or/and audio commands 132, the transmission time required for forwarding information from the portable device 10 to the server 20 can be minimized.

Furthermore, it is also noted that the embodiment shown in FIG. 2 or FIG. 3 can be modified such that the portable device 10 illustrated therein only includes the transmitter system 101, 103. In such an embodiment, the portable device 10 is able to transfer data/commands to the server 200, 230, but cannot receive any incoming data as the receiver system 102, 104 is omitted from the portable device 10. However, as the receiver system 102, 104 is omitted, the minimum power requirements of the portable device are reduced, which can prove useful in various applications.

Figure 4:
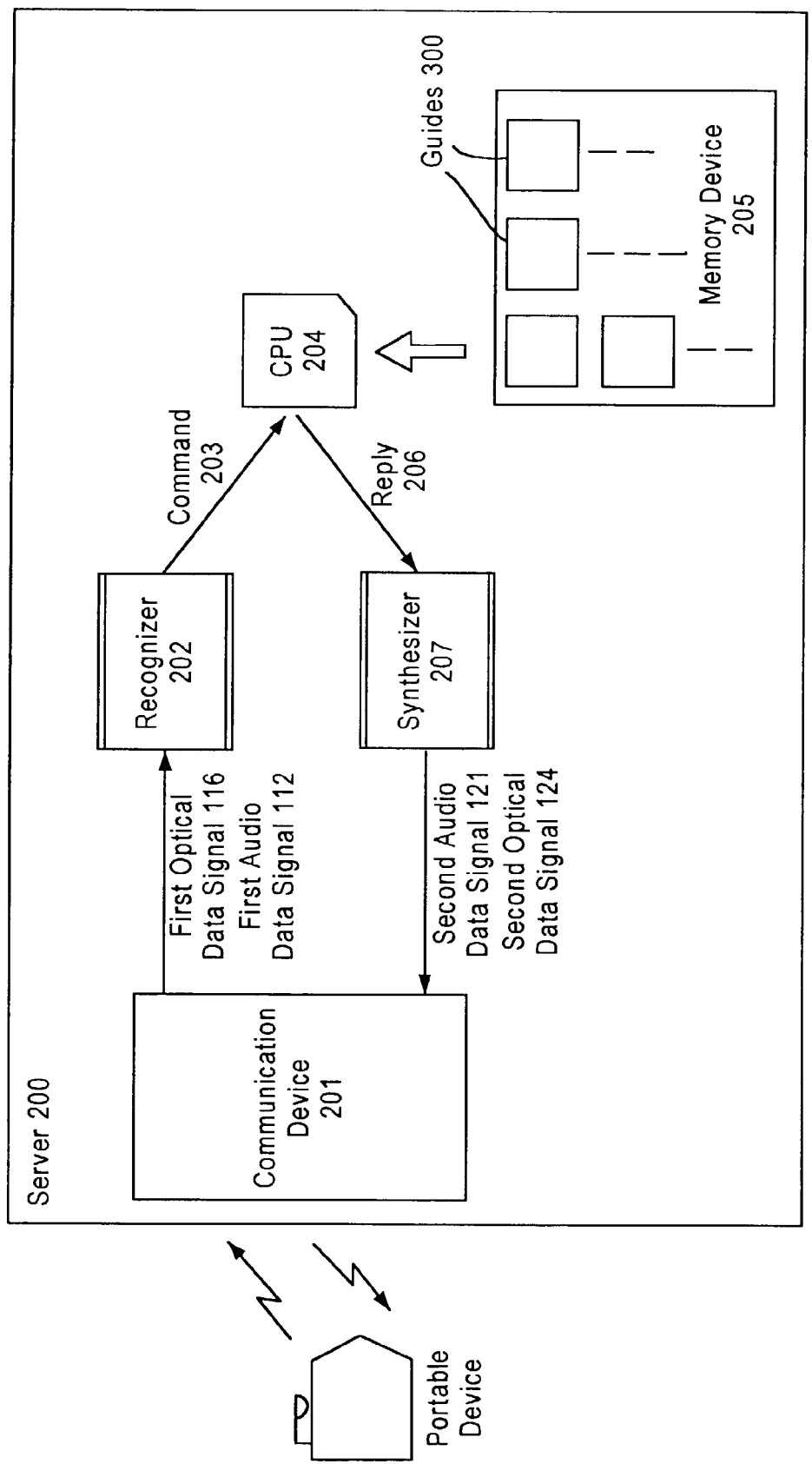
FIG. 4 is a block diagram illustrating a first exemplary embodiment of a home gateway of the present invention.

FIG. 4 illustrates a first exemplary embodiment of a home gateway/server 200 of the present invention, which is utilized with the embodiment of the portable device illustrated in FIG. 2. In the embodiment shown in FIG. 4, the server 200 includes a communication device 201, a data analyzer 202, a CPU 204, a data synthesizer 207 and an activity guide 300. The communication device 201 functions to receive audio data signals 112 and/or optical data signals 116 sent by the transmitter 113 in the portable device 10, and to transmit audio data signals 121 and optical data signals 124 from the server 200 to the portable device 10. It is noted that in the preferred embodiment, the communication device 201 (e.g. data transceiver) is capable of performing wireless and/or optical transmission of data/commands with the portable device 10. In addition, the communication device 201 functions to decode the received audio data signals and/or the received optical data signals in order to remove the modulation utilized in transmitting the data to the server 200. Similarly, the communication device 201 also functions to modulate data/commands prior to transmission of the data/commands to the portable device 10.

Continuing, the data analyzer 202 contained in the server 200 functions to convert the incoming audio and optical data into a corresponding command. More specifically, in the given embodiment, the data analyzer 202 incorporates the speech recognition system noted above to convert the incoming audio data into a corresponding command. This speech recognition system has the ability of limiting the natural language dialog domain to a particular device, system or discourse, allowing for a more accurate interpretation of the meaning of the operator's input speech. The data analyzer 202 interprets the meaning of the operator's input speech and provides appropriate information (e.g., commands) to the server 200 so as to allow the server 200 to process an application associated with the given input, or to retrieve information from any of the devices connected to the server 200 over the network or the Internet.

In one example, depending on the given application being implemented, the data analyzer 202 comprises memory containing prestored "language fragments" which correspond to options available to the user based on the given applications that the system is capable of performing. If the incoming audio data matches one of the prestored "language fragments", then the data analyzer 202 functions to output the command corresponding to the selected language fragment. In the given embodiment, the language fragment stored in the data analyzer 202 identifies a corresponding activity guide (explained below) and a corresponding initial command for execution in conjunction with the activity guide.

In the event there is no matching "language fragment", various options are available. For example, the server 200 can generate an audio and/or optical signal to inform the user that the last instruction was not defined or not understood, or that the user should try again. Another option is for the server 200 to simply ignore the incoming audio signal. Of course, numerous other options also exist.

It is noted that optical data input by the operator via the optical sensor 6 is processed is substantially the same manner. More specifically, optical data, which can be identified by an ID tag generated by the optical sensor and attached to the data, is coupled to the data analyzer 202 and decoded so as to determine the activity guide associated with the data. For example, assuming a bar code is scanned by the optical sensor 6 of the portable device 10, the system can be programmed such that entry of the bar code results in retrieval of an application inquiring if the operator wishes to purchase the item identified by the bar code. The operator would then be prompted with questions regarding the quantity of the item that should be purchased. Upon receiving the necessary response from the operator, the system would initiate the purchase via the Internet connection. Alternatively, the system could be programmed such that upon entry of a bar code, a purchase order for the scanned item is automatically placed without any further interaction with the operator.

The output of the data analyzer 202 is coupled to an input of the CPU 204, which functions to receive and act on the commands 203 output by the data analyzer 202. Upon receiving a command, the CPU 204 accesses the activity guide 300 which is stored in a memory device 205. As explained in further detail below, the activity guide 300 comprises a plurality of programs, each of which is application specific. In the given embodiment, as stated above, the command 203 provided to the CPU 204 identifies the corresponding activity guide 300 in memory 205 necessary for the CPU 204 to retrieve in order to execute the command 203.

If the application corresponding to the activity guide 300 selected by the CPU 204 generates a response or data that needs to be relayed to the user, CPU 204 generates the necessary reply 206 and sends the reply 206 to the data synthesizer 207. The data synthesizer 207 functions to convert the reply 206 to audio data signals 121 and/or optical data signals 124. The output of the data synthesizer 207 is coupled to the communication device 201, which functions to modulate the audio signals 121 and the optical data signals 124 and then transmit the signals to the portable device 10. It is noted that while the foregoing embodiment describes the communication device 201 as performing the demodulation and the modulation of incoming and outgoing signals, it is also possible to incorporate the modulation means for decoding and encoding signals to the data analyzer 202 and the data synthesizer 207, respectively.

In accordance with the embodiment of the home gateway illustrated in FIG. 4, the analysis of the optical data signals 116 and/or the audio data signals 112, which is required to identify the guide and command corresponding to the particular data signal, is assigned to the server 200. Accordingly, in this embodiment, the circuit components and the power requirements of the portable device 10 are minimized.

Figure 5:
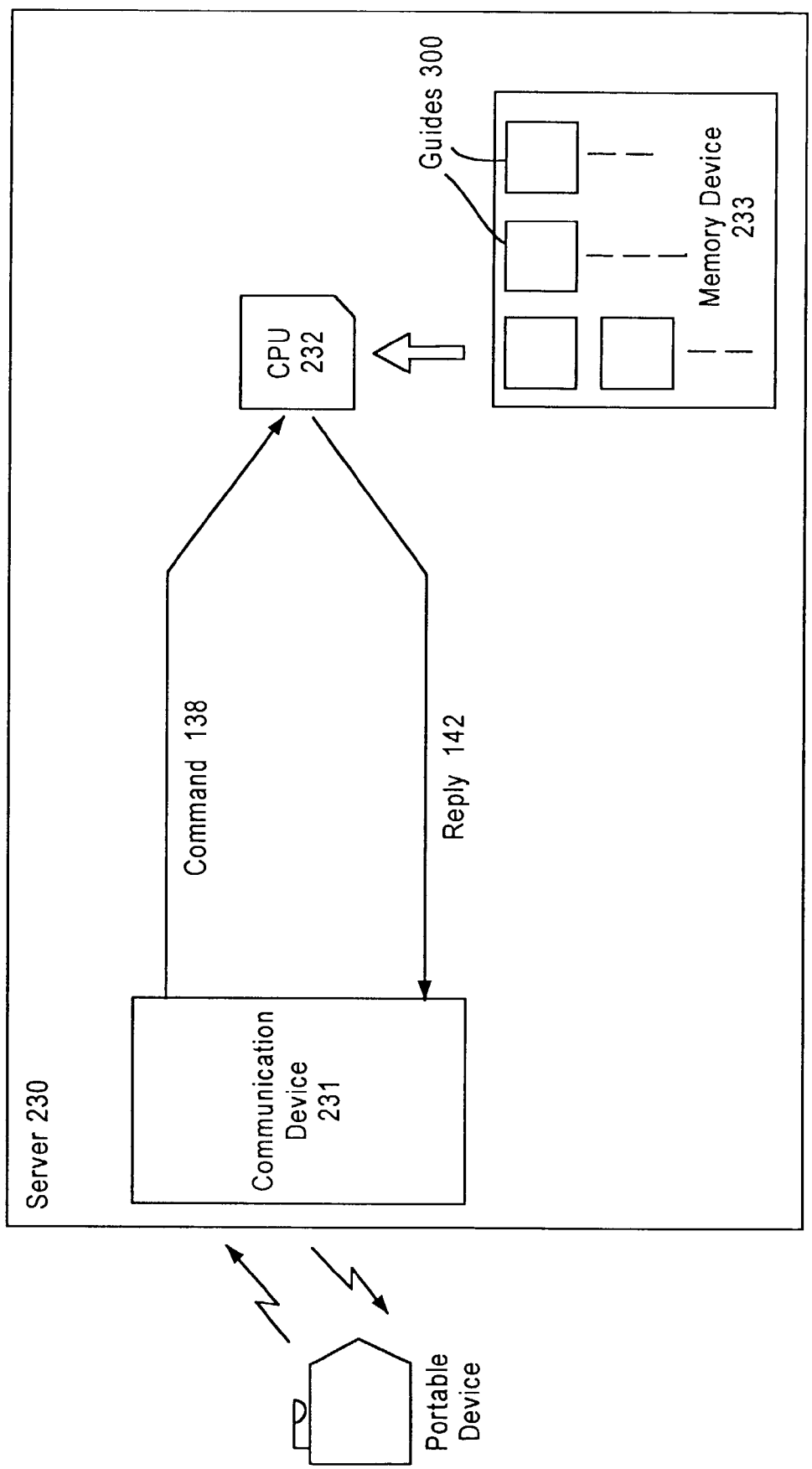
FIG. 5 is a block diagram illustrating a second exemplary embodiment of a home gateway of the present invention.

FIG. 5 is a block diagram illustrating a second exemplary embodiment of the home gateway of the present invention, which is designed for use with the portable device illustrated in FIG. 3. The second embodiment of the home gateway is the same as the embodiment shown in FIG. 4, with the exception that the server 230 does not include data analyzer 202 and data synthesizer 207. These components are omitted from the server 230 because the portable device 10 of FIG. 3 functions to identify the command and activity guide associated with the incoming data, which are transmitted by the portable device 10 to the communication device 231 of the server 230. In other words, the portable device 10 functions to analyze the data input by the user and to generate the corresponding command, which identifies the appropriate activity guide and initial command to be executed. The commands 138 received by the communication device 231 are coupled directly to the CPU 104. Similarly, any reply to be forwarded back to the portable device 10 is generated by the CPU 204. The reply 142 is then forwarded directly to the communication device 231, which functions to transmit the command to the portable device. All other aspects of the operation of the server 230 illustrated in FIG. 5 is the same as that described above with regard to the first embodiment of the server 20 illustrated in FIG. 4.

The speech recognition and parsing techniques utilized in conjunction with the execution of the activity guides 300 of the present invention are contained in the server 200, 230 of the present invention are described in U.S. patent application Ser. Nos. 09/383,758 and 09/875,740, both of which are incorporated herein by reference. The following description sets forth the utilization of the activity guides 300 in conjunction with the portable device 10 and server 200 so as to allow for control of various activities via the portable device 10. In the following description, the first embodiment of the portable device (FIG. 2) and the server (FIG. 4) are referenced. Of course, the second embodiment of the portable device and the server can also be utilized.

Figure 6:
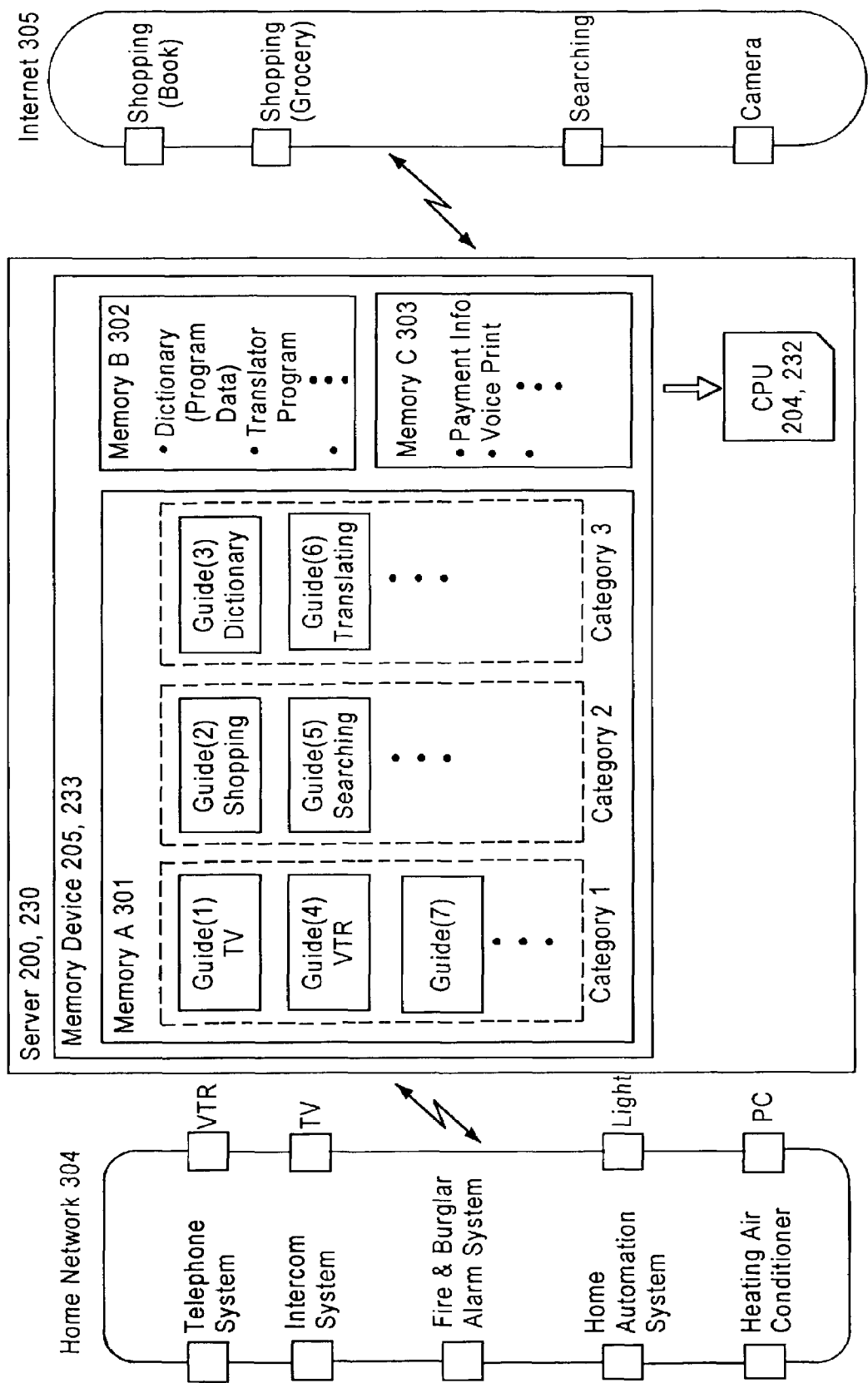
FIG. 6 is a block diagram illustrating a more detailed embodiment of a home gateway of the present invention.

FIG. 6 illustrates a more detailed embodiment of the memory device 205 of the server 200, as well as an exemplary configuration of a home network 304 and exemplary Internet connections. Both the home network 304 and the Internet websites 305 are accessible by the server 200, 230. Referring to FIG. 6, in one embodiment, memory device 205 is divided into at least 3 areas, namely, memory A 301, memory B 302, and memory C 303.

In the given embodiment, memory A 301 functions to store the activity guides related to controlling electrical components coupled to the home network 304. As stated above, each activity guide includes preprogrammed rules, which differ from application to application. Moreover, each activity guide is application specific. In addition, each command 203, which is generated by the data analyzer 202, identifies a corresponding activity guide 300, which is retrieved and processed by the CPU 204, when the command is received by the CPU 204.

Figure 7B:
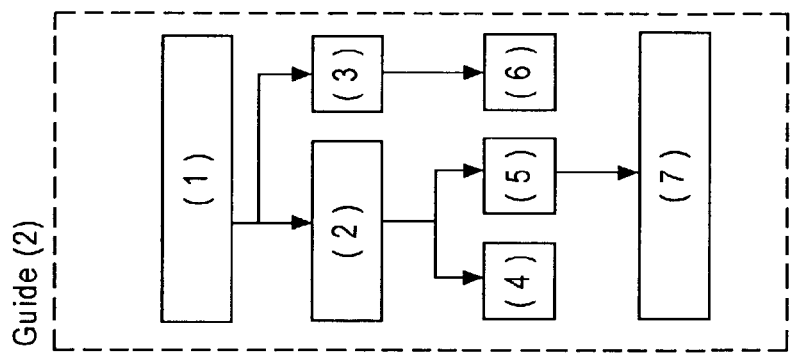
FIGS. 7(a) and 7(b) are exemplary illustrations of an activity guide in accordance with the present invention.
Figure 7A:
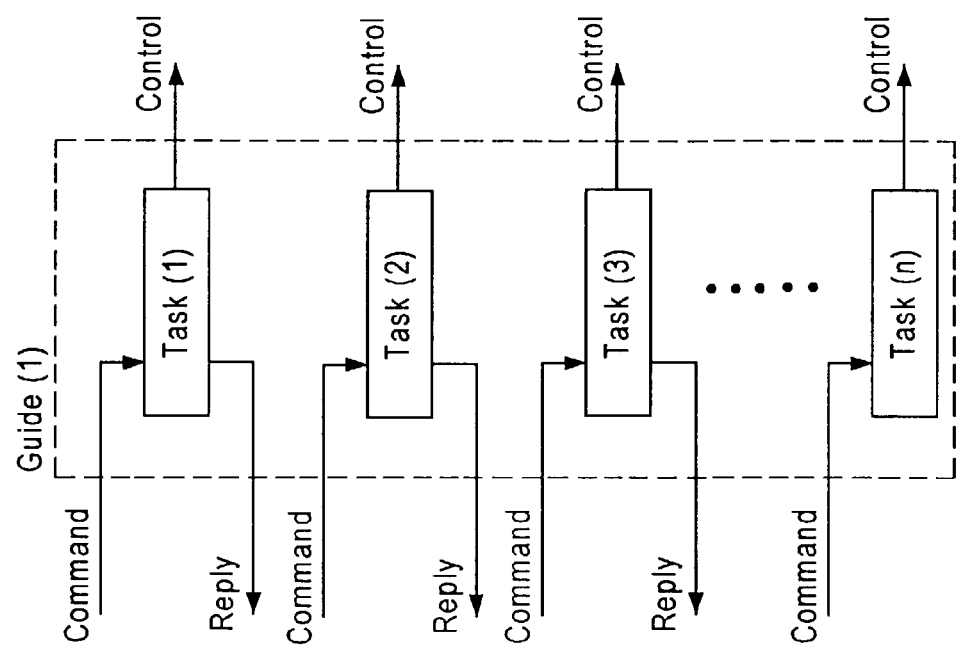

FIG. 7(a) is an exemplary illustration of an activity guide in accordance with the present invention. As shown, the activity guide 300 includes tasks to be performed, typically by the CPU, which are necessary to accomplish the application associated with the given activity guide. In addition, the guide may result in the generation of responses which are forwarded back to the operator.

In operation, assuming that the CPU 204 receives command 203 and that command 203 corresponds to guide (1) and task (1) contained in memory A, the CPU 204 retrieves guide(1) and performs task(1). Upon executing task(1), the CPU 204 records a result (i.e., reply) if necessary. In the event a reply is necessary, the CPU 204 forwards the reply to the data synthesizer 207 as detailed above. If the next command received by CPU 204 corresponds to guide (1) and task(2), the CPU 204 retrieves task (2) in guide (1) and executes the function associated with task(2). The foregoing process is performed whenever a command is generated by the portable device 10. As noted above, not all functions contained in the activity guides generate a reply which needs to be forwarded back to the portable device. Furthermore, it is also possible for the activity guide 300 to have a tree-like structure as illustrated by guide (2) in FIG. 7(b), where results of the previous task affects the selection of the next task to be performed.

Returning again to FIG. 6, in the given embodiment, activity guides 300 are classified into three categories. The first category includes guides containing tasks related to controlling apparatus connected on the home network 304. Such apparatus include, but are not limited to, (a) audio/video equipment, for instance TVs, VCRs, DVDs, CD players, (b) electrical appliances, such as light systems, refrigerators, microwave ovens, heating and cooling systems, (c) computers, (d) home automation systems, (e) fire alarm systems, (f) burglar alarm systems, (g) telephone systems, and (h) intercom systems. The second category includes guides containing tasks related to controlling apparatus or websites connected to the Internet. For example, ordering goods via an Internet shopping website, running a search engine, etc. The third category includes guides containing tasks related to executing services in the server 200, for example, performing dictionary functions, translation functions, recording voices, or searching address books, etc.

In the given embodiment, memory B 302 functions to store the data and programs utilized when performing tasks contained in the third category of guides contained in the activity guide. For example, memory B 302 stores dictionaries, programs for searching the dictionaries and programs for performing translation functions. Of course, the data can be stored in any memory location where it is accessible during operation.

In the given embodiment, memory C 303 stores any other additional information or data that may be required for performing the task contained in the activity guides. For example, memory C 303 stores payment information, such as credit card numbers. As stated, this information is retrieved by the CPU 204, 232 as needed when processing the programs set forth in the activity guides 300.

Referring again to FIG. 6, as stated above, the server 200, 230 is connected to home network 304, which for example utilizes a serial bus architecture to connect all components, so as to allow for control of the various household components and appliances, etc. However, in the given embodiment, the server 200 is also coupled to the Internet 305 via any suitable connection. Examples of apparatus or websites accessible by the server 200 via the Internet connection 304 include, but are not limited to, a camera placed on a road or ski area, a shopping website, or a website for running a searching engine. Such apparatus and websites are subject to control by the activity guide 300 of the second category.

The operation of the present invention will now be described in connection with a series of examples of how the system of the present invention can be utilized to perform numerous household activities. It should be noted, however, that the examples set forth herein are merely illustrative. Additional applications of the present invention are clearly possible.

Figure 8:
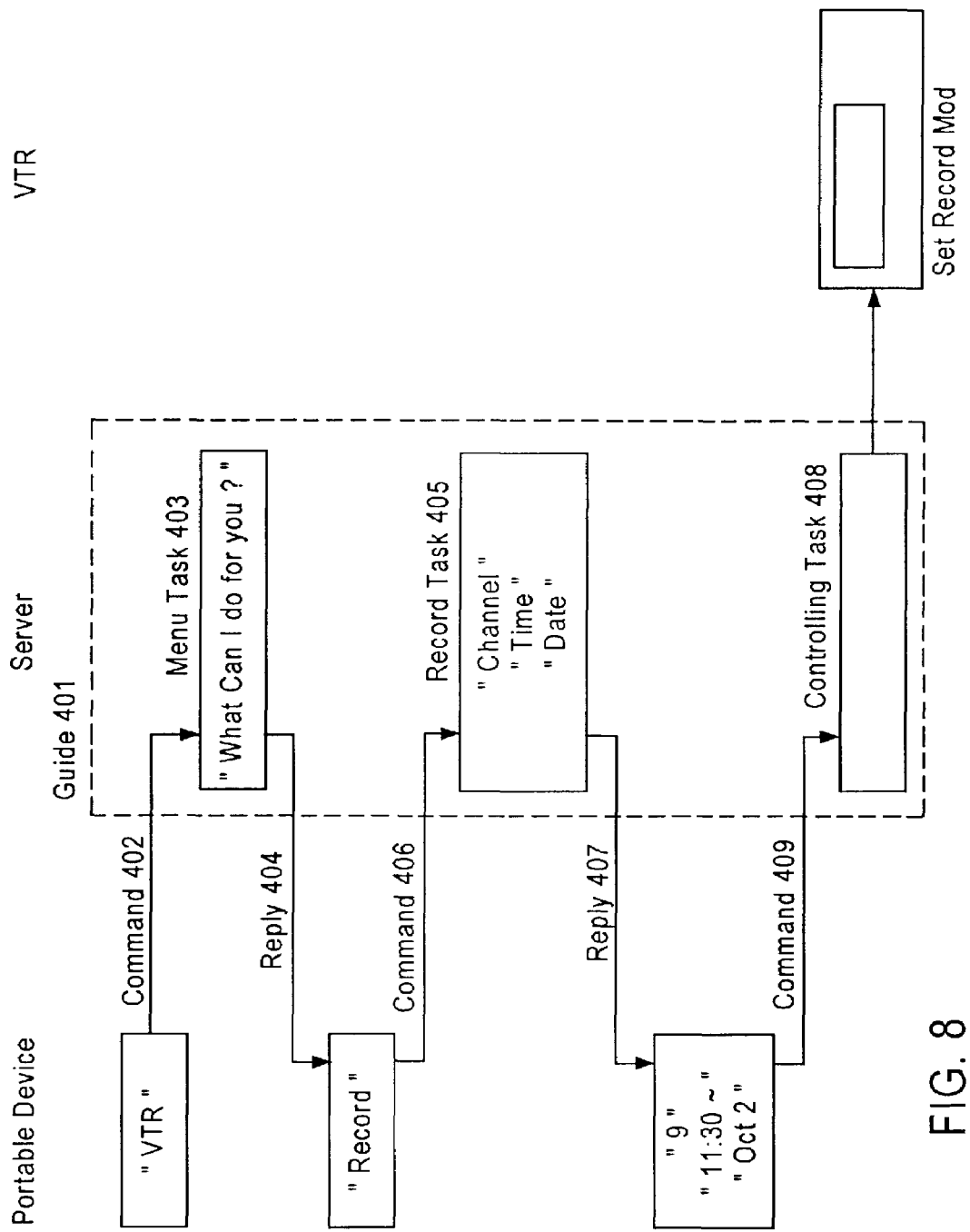
FIG. 8 is an exemplary flow diagram of a programming guide for controlling a video tape recorder "VTR" via the home gateway.

The first application to be described relates to utilizing the present invention to program a VCR (or VTR). FIG. 8 illustrates an exemplary embodiment of the activity guide 401 stored in memory A 301 associated with controlling/programming a VCR. The example relates to programming the VCR to record a future event.

Upon input of a human voice stating "VTR" to the microphone 3 contained in the portable device 10, the audio coder 115 contained in the portable device 10 functions to encode this audio data, which is then transmitted to the server 200 by the transmitter 113 of the portable device 10 in the manner detailed above.

Upon receipt of the transmitted data by the server 200, the audio data is coupled to the data analyzer 202 via the communication device 201. The data analyzer 202 utilizing the speech recognition software functions to interpret the language fragment and determine if the received audio data corresponds to any preprogrammed language fragments. In the current example, the received audio data "VTR" matches the preprogrammed "VTR" language fragment, which corresponds to guide 401 and command 402. Accordingly, the CPU 204 retrieves guide 401 and begins execution of the program associated therewith, the first step of which requires inputting the phrase "VTR" (command 402) into the guide 401.

Upon receipt of command 402, the program associated with guide 401 functions to generate reply 404 (task 403), which is an audio question "What can I do for you?". The data representing reply 404 is generated by the CPU 204, 232 and coupled to the data synthesizer 207 such that it can be encoded in a manner suitable for transmission to the portable device 10 via the communication device 201. Upon receipt of the encoded reply data by the receiver 120 of the portable device 10, the data is coupled to the audio decoder 122, and then coupled to the speaker 4 so as to be reproduced for the operator. Alternatively, the reply 404 can be displayed on the display 5 as a visual message.

In response to the foregoing inquiry, it is assumed that the operator states "Record". Thus, audio data is received by the microphone 3 and coupled to the audio coder 115, and is then processed in the same manner as set forth above. Specifically, the data is encoded by the audio coder 115 and then transmitted to the server 200 by the transmitter 113 of the portable device 10.

Upon receipt of the transmitted data by the server 200, the audio data is coupled to the data analyzer 202 via the communication device 201. The data analyzer 202 utilizing the speech recognition software functions to interpret the language fragment and determine if the received audio data corresponds to any preprogrammed language fragments. In the current example, the received audio data "Record" matches the preprogrammed "Record" language fragment, which corresponds to command 406. Accordingly, the CPU 204 executes command 406.

Upon receipt of command 406, the program associated with guide 401 functions to execute task 405, and generate reply 407, which is an audio question requesting the operator to input the "Channel, Time and Date" of the program to be recorded. The data representing reply 407 is generated by the CPU 204, 232 and coupled to the data synthesizer 207 such that it can be encoded in a manner suitable for transmission to the portable device 10 via the communication device 201. Upon receipt of the encoded reply data by the receiver 120 of the portable device, the data is coupled to the audio decoder 122, and then coupled to the speaker 4 so as to be reproduced for the operator.

Continuing the process, the operator then inputs a verbal response indicating the desired channel, time and date, and this audio data is encoded and transmitted to the server 200, 230. Utilizing the data analyzer 202 it is determined that the data corresponds to command 409. Upon receipt of command 409, the program associated with guide 401 functions to execute task 408, which generates control signals, which are transmitted to the VCR via the home network 304 and are utilized to program the VCR.

It is noted that while the foregoing example utilizes the operator's voice to input the initial data, it is also possible for the data to be input as text data or bar-cord via the optical sensor 6 included in the portable device 10. Furthermore, assuming the bar code contained all the necessary information for recording the program, upon entry of the program, the system would automatically program the VCR without requiring any additional information from the operator.

Figure 9:
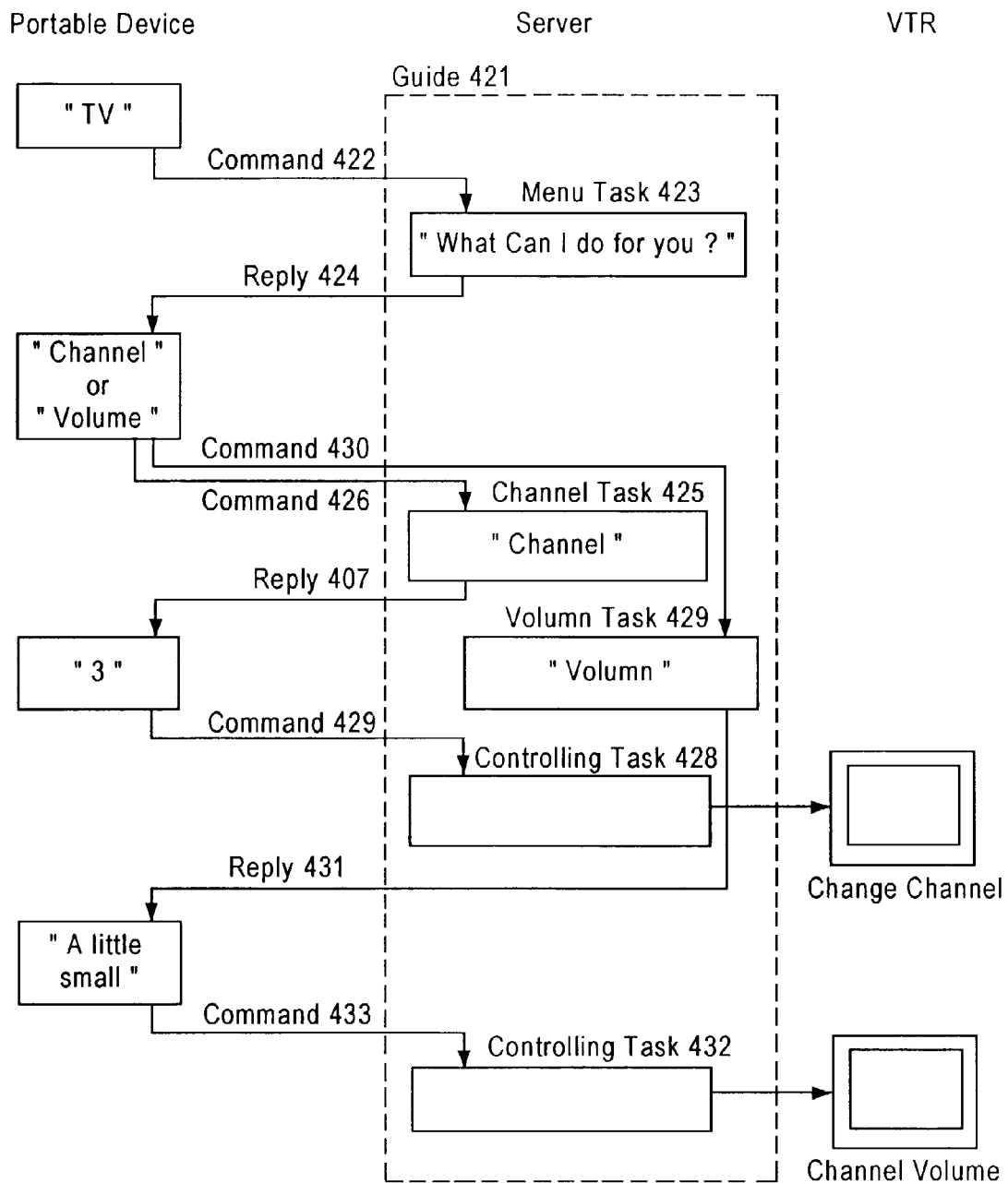
FIG. 9 is an exemplary flow diagram of a programming guide for controlling a TV via the home gateway.

FIG. 9 illustrates an exemplary embodiment of the activity guide stored in memory A 301 associated with controlling/programming a TV. The process is essentially the same as the process described above in conjunction with FIG. 8. As shown in FIG. 9, the exemplary activity guide also has a tree-like structure.

In operation, when the word "TV" is input into microphone 3 in the portable device 10, in the same manner as set forth above, the data is encoded by audio coder 111 and transmitted to the server 200 via the transmitter 113. Upon receipt of the data, the data analyzer 202, utilizing the speech recognition software, functions to interpret the language fragment and determine if the received audio data corresponds to any preprogrammed language fragments. In the current example, the received audio data "TV" matches the preprogrammed "TV" language fragment, which corresponds to guide 421 and command 422. Accordingly, the CPU 204 retrieves guide 421 and begins execution of the program associated therewith, the first step of which requires inputting the phrase "TV" (command 422) into the guide 421.

Upon receipt of command 422, the program associated with guide 421 functions to generate reply 424 (task 423), which is an audio question requesting the operator to indicate what her/she would like done. In the given example, the reply sent back to the operator states "What can I do for you". The data representing reply 424 is generated by the CPU 204 and coupled to the data synthesizer 207 such that it can be encoded in a manner suitable for transmission to the portable device 10 via the communication device 201. Upon receipt of the encoded reply data by the receiver 120 of the portable device 10, the data is coupled to the audio decoder 122, and then coupled to the speaker 4 so as to be reproduced for the user.

Upon receipt of reply 424, the operator can select any function/control of a TV that can be varied, for example, "channel" or "volume". Assuming the operator selects "channel", by speaking channel into the microphone 3, this data is encoded and sent to the server 200, 230, where it is determined to correspond to command 426. Upon receipt of the command 426, the program associated with guide 421 functions to generate reply 427 (task 425), which is an audio question requesting the operator to indicate what channel should be selected. The reply 427 is then forwarded to the operator. Upon being queried as to the desired channel, assuming the operator states the desired channel, this audio data is encoded and sent to the server, where it is determined to correspond to command 429. Upon receipt of command 429, the program associated with guide 421 functions to generate control signals (task 428), which are transmitted to the TV via the home network 304 and utilized to program the TV to the desired channel.

Continuing this example, assuming the operator selected "volume", this data would be encoded and transmitted to the server 200, 230, where it is determined to correspond to command 430. Upon receipt of the command 430, the program associated with guide 421 functions to generate reply 431 (task 429), which is an audio question requesting the operator to indicate if the volume should be lower or higher. The reply 431 is then forwarded to the operator. Upon being queried as to the desired volume, assuming the operator states the desired volume change (e.g., higher or lower), this audio data is encoded and sent to the server 200, 230, where it is determined to correspond to command 433. Upon receipt of command 433, the program associated with guide 421 functions to generate control signals (task 432), which are transmitted to the TV via the home network 304 and utilized to adjust the volume of the TV.

Figure 10:
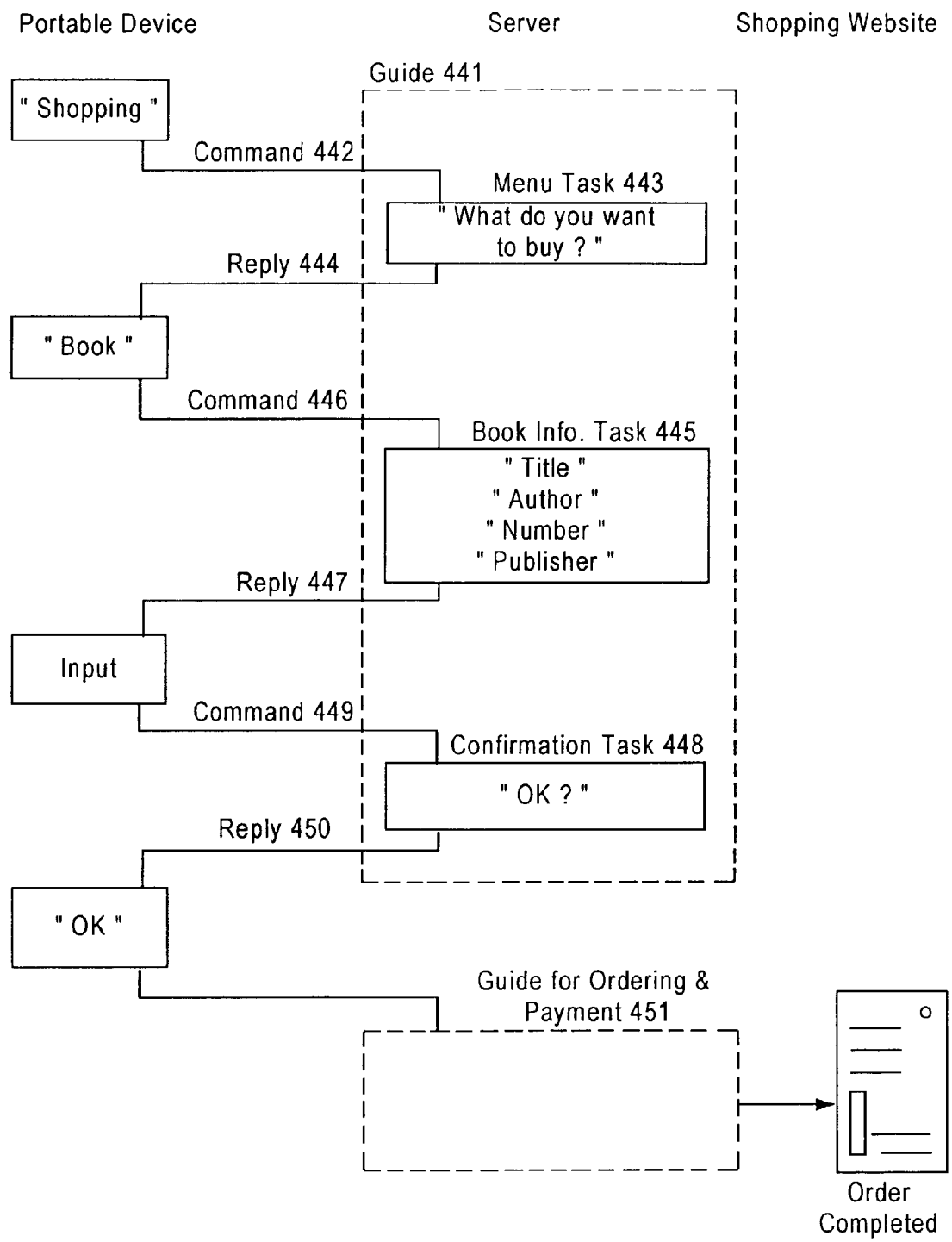
FIG. 10 is an exemplary flow diagram of a programming guide for purchasing a book via the home gateway.

An illustration of how the portable device of the present invention can be utilized to purchase items over the Internet is illustrated in FIG. 10. Specifically, FIG. 10 is an exemplary embodiment of the activity guide stored in memory A 301 associated with purchasing items (e.g., books) via the Internet utilizing the present invention. As shown in FIG. 10, the exemplary activity guide also has a tree-like structure.

In operation, when the word "shopping" is input into microphone 3 in the portable device 10, in the same manner as set forth above, the data is encoded by audio coder 111 and transmitted to the server 200, 230 via the transmitter 113. Upon receipt of the data, the data analyzer 202, utilizing the speech recognition software, functions to interpret the language fragment and determine if the received audio data corresponds to any preprogrammed language fragments. In the current example, the received audio data "shopping" matches the preprogrammed "shopping" language fragment, which corresponds to guide 441 and command 442. Accordingly, the CPU 204 retrieves guide 441 and begins execution of the program associated therewith, the first step of which requires inputting the phrase "shopping" (command 442) into the guide 441.

Upon receipt of command 442, the program associated with guide 441 functions to generate reply 444 (task 443), which is an audio question requesting the operator to indicate what her/she would like to purchase. In the given example, the reply sent back to the operator states "What do you want to buy?". The data representing reply 444 is generated by the CPU 204 and coupled to the data synthesizer 207 and transmitted to the portable device 10 via the communication device 201. Upon receipt of the encoded reply data by the receiver 120 of the portable device, the data is coupled to the audio decoder 122, and then coupled to the speaker 4 so as to be reproduced for the operator.

Upon receipt of reply 444, the operator identifies the type of item he/she wishes to purchase, which in this example is a book. Accordingly, upon receiving reply 444, the operator speaks the word "book" into the microphone 3. This data is encoded and sent to the server 200, 230, where it is determined to correspond to command 446. Upon receipt of the command 446, the program associated with guide 441 functions to generate reply 447 (task 445), which is an audio question requesting the operator to indicate the relevant information regarding the book to be purchased (e.g., title, author, publisher, etc.). The reply 447 is then forwarded to the operator. Upon being queried as to the desired book, the operator provides the requested information by speaking into the microphone 3. The resulting audio data is encoded and sent to the server, where it is determined to correspond to command 449. Upon receipt of command 449, the program associated with guide 441 functions to generate reply 450 (task 448), which requests the operator confirm that the book should be purchased. The reply 449 is then forwarded to the operator, and assuming the operator confirms the order, the program associated with guide 441 functions to order the book by accessing the Internet connection 305, and forwarding the information to a particular website. Details of the operation of the present invention for ordering items via the Internet 305 is explained below.

In the foregoing example, the program corresponding to the guide 441 sends a reply 447 as a message requesting the operator to input all of the information about "Title", "Author", "Number", and "Publisher". However, as an alternative, it is also possible to divide the request into multiple tasks such that a separate reply is generated for each requested piece of information. In addition, data (e.g., bar code or text) may also be entered by the operator utilizing the optical sensor 6.

Figure 11:
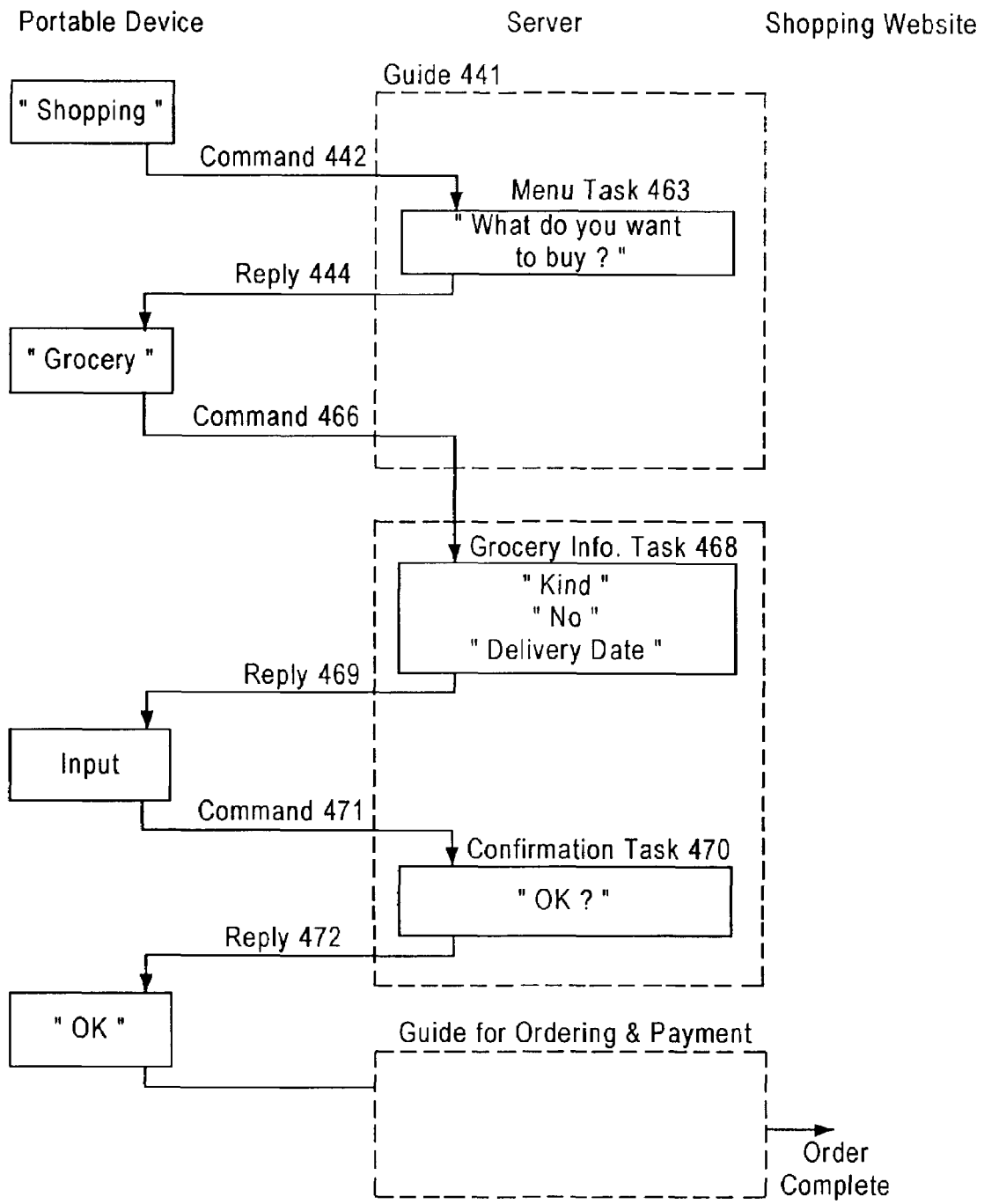
FIG. 11 is an exemplary flow diagram of a programming guide for purchasing groceries via the home gateway.

A second example of how the portable device of the present invention can be utilized to purchase items over the Internet is illustrated in FIG. 11. Specifically, FIG. 11 is an exemplary embodiment of the activity guide stored in memory A 301 associated with purchasing groceries via the Internet utilizing the present invention.

In operation, when the phrase "shopping" is input into microphone 3 in the portable device, in the same manner as set forth above, the data is encoded by audio coder 111 and transmitted to the server 200 via the transmitter 113. Upon receipt of the data, the data analyzer 202, utilizing the speech recognition software, functions to interpret the language fragment and determine if the received audio data corresponds to any preprogrammed language fragments. In the current example, the received audio data "shopping" matches the preprogrammed "shopping" language fragment, which corresponds to guide 441 and command 442. Accordingly, the CPU 204 retrieves guide 441 and begins execution of the program associated therewith, the first step of which requires inputting the phrase "shopping" (command 442) into the guide 441.

Upon receipt of command 442, the program associated with guide 441 functions to generate reply 444 (task 443), which is an audio question requesting the operator to indicate what her/she would like to purchase. In the given example, the reply sent back to the operator states "What do you want to buy?". The data representing reply 444 is generated by the CPU 204 and coupled to the data synthesizer 207 and transmitted to the portable device 10 via the communication device 201. Upon receipt of the encoded reply data by the receiver 120 of the portable device, the data is coupled to the audio decoder 122, and then coupled to the speaker 4 so as to be reproduced for the operator.

Upon receipt of reply 444, the operator identifies the type of item he/she wishes to purchase, which in this example is groceries. Accordingly, upon receiving reply 444, the operator speaks the word "groceries" into the microphone 3. This data is encoded and sent to the server 200, 230, where it is determined to correspond to command 466. Upon receipt of the command 466, the program associated with guide 441 functions to generate reply 469 (task 468), which is an audio question requesting the operator to indicate the relevant information regarding the types and quantities of groceries to purchase as well as the desired delivery date. The reply 469 is then forwarded to the operator. Upon being queried as to the desired groceries, the operator provides the requested information by speaking into the microphone 3. The resulting audio data is encoded and sent to the server, where it is determined to correspond to command 471. Upon receipt of command 471, the program associated with guide 441 functions to generate reply 472 (task 470), which requests the operator confirm that the identified groceries should be purchased. The reply 472 is then forwarded to the operator, and assuming the operator confirms the order, the program associated with guide 441 functions to order the groceries by accessing the Internet 305.

Figure 12:
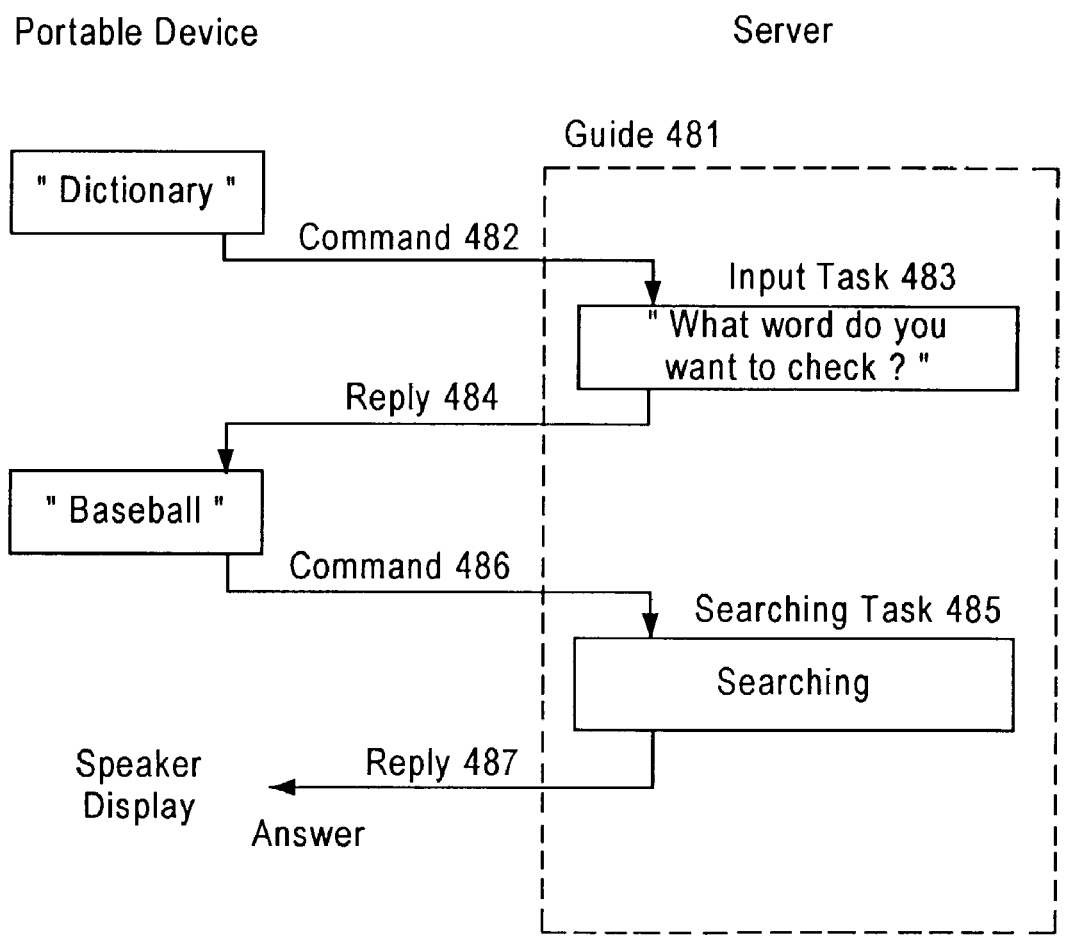
FIG. 12 is an exemplary flow diagram of a programming guide for performing search related functions via the home gateway.

Another application of the present invention relates to utilizing the portable device to perform activities for searching database-type files, such as, dictionaries, telephone directories, address directories, etc. FIG. 12 illustrates an exemplary embodiment of the activity guide stored in memory A 301 associated with searching a dictionary to retrieve the definition of a given word.

In operation, when the word "dictionary" is input into the microphone 3 in the portable device, in the same manner as set forth above, the data is encoded by audio coder 111 and transmitted to the server 200 via the transmitter 113. Upon receipt of the data, the data analyzer 202, utilizing the speech recognition software, functions to interpret the language fragment and determine if the received audio data corresponds to any preprogrammed language fragments. In the current example, the received audio data "dictionary" matches the preprogrammed "dictionary" language fragment, which corresponds to guide 481 and command 482. Accordingly, the CPU 204 retrieves guide 481 and begins execution of the program associated therewith, the first step of which requires inputting the phrase "shopping" (command 482) into the guide 481.

Upon receipt of command 482, the program associated with guide 481 functions to generate reply 484 (task 483), which is an audio question requesting the operator to indicate the word to be defined. In the given example, the reply sent back to the operator states "What word do you wish to check?". The data representing reply 484 is generated by the CPU 204 and coupled to the data synthesizer 207 and transmitted to the portable device 10 via the communication device 201. Upon receipt of the encoded reply data by the receiver 120 of the portable device, the data is coupled to the audio decoder 122, and then coupled to the speaker 4 so as to be reproduced for the operator.

Upon receipt of reply 484, the operator states the word to be checked, which in this example is a "baseball". Accordingly, upon receiving reply 484, the operator speaks the word "baseball" into the microphone 3. This data is encoded and sent to the server 200, 230, where it is determined to correspond to command 486. Upon receipt of the command 486, the program associated with guide 481 functions to generate reply 487 (task 485), which is an audio answer stating the definition of baseball. It is again noted that the answer can also be provided in a visual format utilizing the display device contained in the portable device 10.

Figure 13A:
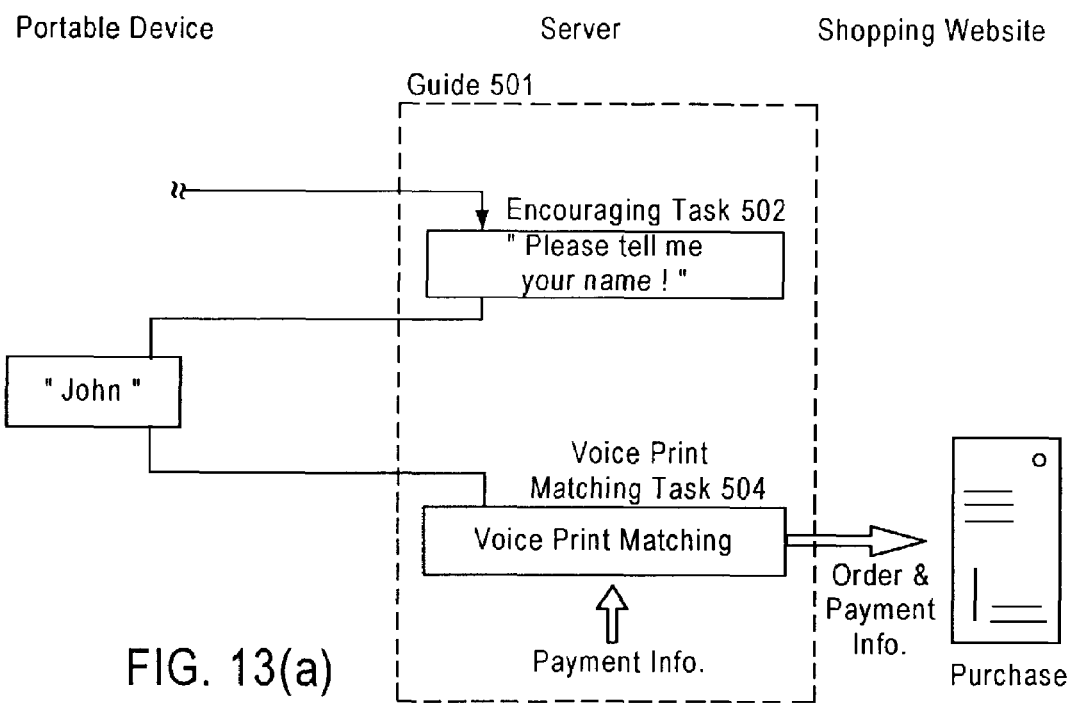
FIGS. 13(a)–(d) are exemplary flow diagrams of programming guides for placing purchase orders and processing user accounts via the home gateway.
Figure 13B:
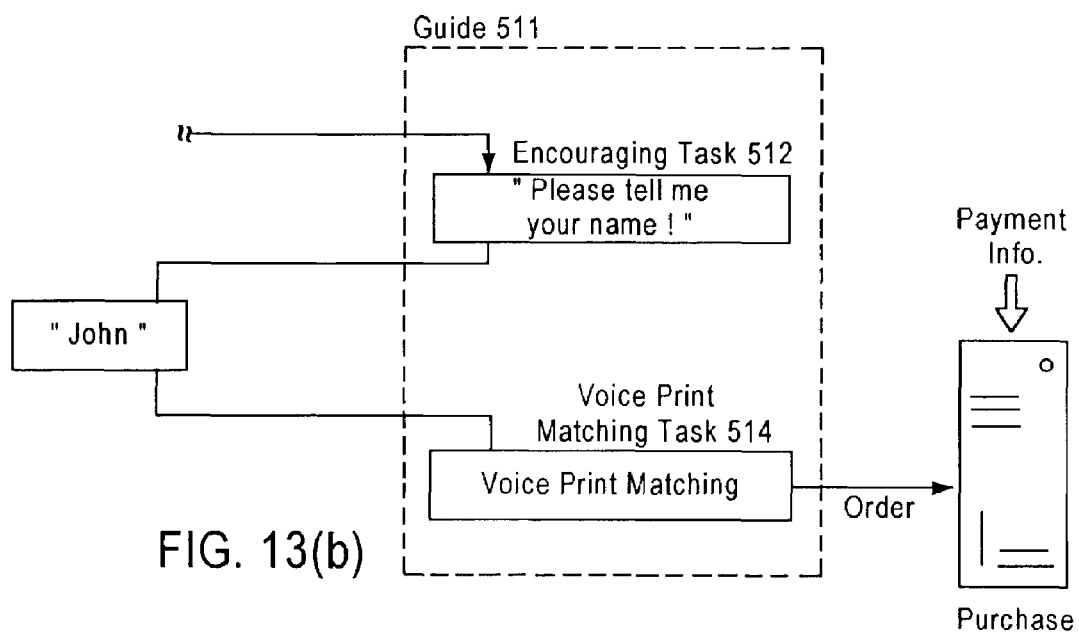
Figure 13C:
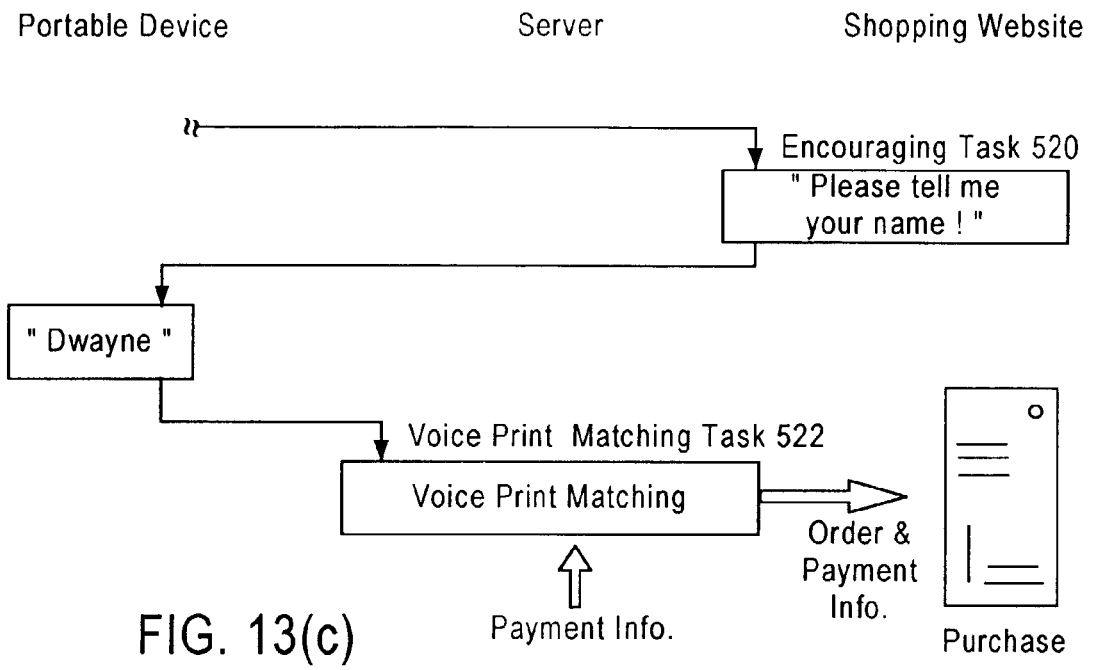
Figure 13D:
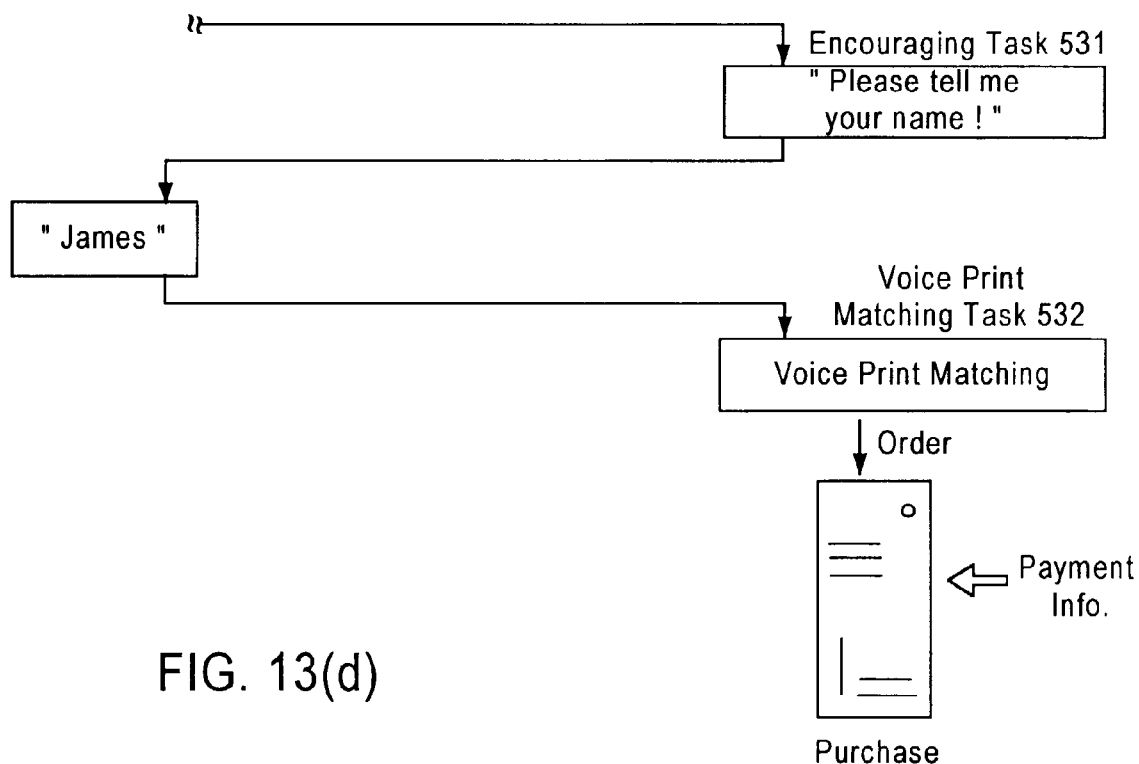

As noted above, when utilizing the portable device of the present invention to order items via the Internet, it is typically necessary to provide payment information. FIG. 13(a) is a first example of activity guide utilized for processing such orders and for providing payment information. Referring to FIG. 13(a), upon completion of an order that requires payment, the server 200 function to access and execute the program associated with guide 501. Referring to guide 501, the first step entails the generation of an inquiry requesting that the operator state his/her name. For example, the program executes a task 502 that generates a reply 503 as the message "Please tell me your name". Assuming the operator states his name into the microphone 3, voice print matching task 504 is then executed so as to compare the voice print of the operator, which is forwarded by the portable device 10, with the operator's voice print that was prestored in memory C 303 in advance during an initialization process. If the voice prints match, the voice print matching task 504 places the order and sends payment information to the shopping website through the Internet connection and completes the purchase. In the given embodiment, the payment information (e.g., credit card) is also prestored in memory C during the initialization process.

FIG. 13(*b*) is second example of activity guide for processing orders and for providing payment information. The difference between the guide 501 of FIG. 13(*a*) and the guide 511 of FIG. 13(*b*) is where the payment information is stored. In this example, the payment information is stored at the website of the seller. As such, the server 200 doesn't need to send the payment information over the Internet connection, which is advantageous for reasons of security. All other aspects of guide 501 and guide 511 are the same.

FIGS. 13(*c*) and (*d*) also illustrate exemplary guides for purchasing items via the Internet, which correspond to the guides illustrated in FIGS. 13(*a*) and 13(*b*), respectively. The essentially difference between the guides illustrated in FIGS. 13(*c*) and 13(*d*) is that the program for prompting the operator to enter his/her name is executed by a computer located at the seller's website. In the guide of FIG. 13(*c*), name prompting task 521 is stored and executed on the shopping website and the voice print matching task 521 is stored and executed in the server 200. In the guide of FIG. 13(*d*), both the name prompting task 531 and the voice print matching task 532 are stored and executed on the shopping website.

It is further noted that the portable device of the present invention can be utilized to automatically initiate the ordering of items via the Internet. For example, the server 200 can be programmed into a mode of operation such that when a barcode is scanned by the portable device 10, the server automatically forwards data representing the item scanned to the predefined website and places an order for the item to be purchased. The server can also be programmed to perform the same function when the operator simply states "buy [item to be purchased]". In this instance, upon receiving the instruction from the portable device, the server places the order at the predetermined website.

While various embodiments of the portable device and the control system of the present invention have been described above, other variations are possible. For example, in one variation the portable device only includes one of the microphone and the optical sensor, and all data is input utilizing the sensor included in the portable device.

In another variation, multiple portable devices can be utilized with a given server. In such a scenario, each portable device utilized would be assigned an identification number, which would be transmitted by the server along with any data transmission so as to allow the given portable device to confirm that the data was intended for the given portable device.

In another variation, the portable device is voice activated such that the portable device substantially powers down when not being utilized for a predefined period of time so as to save power. Then, upon receipt of a voice command, the portable device automatically resumes operation.

In yet another variation, the microphone includes noise-canceling circuitry so as to allow for elimination of spurious background noise typically found in a home.

Furthermore, additional applications of the present invention are also possible. For example, by utilizing the control system of the present invention, it is possible to preprogram the server such that upon entry of any bar code data representing a product, the server automatically places an order with a predetermined seller over the Internet to purchase the product represented by the bar code. For example, assuming the operator is out of milk, by scanning the bar code on the used milk carton utilizing the portable device, the bar code information is forwarded to the server. The server, upon receiving the bar code information, places the order via the Internet connection. It is noted that the server can be programmed to order each item as it is scanned or alternatively to create a list of scanned items and place orders each week (or every other week, etc.). Moreover, assuming the payment information has be pre-arranged, for example, in the manner set forth above, the act of swiping the bar code of the milk carton is the only act the operator must perform in order to have the order placed.

Indeed, the portable device and control system allows for many such types of operations by simply placing one command. For example, as an alternative to the foregoing, the operator may simply state order milk into the microphone of the portable device. Assuming the standard milk order is prestored in memory in the server, the server then functions to place the standard milk order via the Internet connection. The ordering of any other products can be performed in the same manner. Similarly, by simply stating a command into the microphone, the operator can control any component coupled to the home network (e.g., tune a TV to channel 8), or access any website via the Internet connection.

As stated above, the present invention provides significant advantages over the prior art. Most importantly, the control system of the present invention allows an operator to easily and readily control home activities without having to directly interface with or use a PC, and which allows the operator to program and control the home gateway from essentially any area of the home without having to access a PC.

Although certain specific embodiments of the present invention have been disclosed, it is noted that the present invention may be embodied in other forms without departing from the spirit or essential characteristics thereof. The present embodiments are therefor to be considered in all respects as illustrative and not restrictive, the scope of the invention being indicated by the appended claims, and all changes that come within the meaning and range of equivalency of the claims are therefore intended to be embraced therein.

We claim:

1. A portable device for communicating with a server, said portable device comprising:
    a body;
    a microphone for receiving first audio data;
    an audio analyzer for extracting semantic information from the first audio data and converting said semantic information into an audio command;
    an optical sensor for reading first optical data;
    an optical analyzer for converting the first optical data to an optical command; and
    a transmitter for transmitting at least the audio command or the optical command to the server.
2. The portable device of claim 1 further comprising:
    a receiver for receiving an audio reply from the server;
    an audio synthesizer for converting the audio reply to second audio data; and
    a speaker for outputting the second audio data.
3. The portable device of claim 1 further comprising:
    a receiver for receiving an optical reply from the server;
    an optical synthesizer for converting the optical reply to second optical data; and
    a display for displaying the second optical data.

4. The portable device of claim 1, wherein the first audio data corresponds to a human voice.

5. The portable device of claim 1, wherein the first optical data is a bar code or text.

6. The portable device of claim 1, wherein the portable device has a configuration such that the body has a shape of pen.

7. The portable device of claim 2, wherein the microphone and the speaker are positioned on a same side of the body.

8. The portable device of claim 2, wherein the microphone and the speaker are positioned on a same side of the body, and the optical sensor is placed on an opposite side of the body.

9. A control system including a portable device and a server, said portable device comprising:
a body;
a microphone for receiving first audio data;
a data analyzer for extracting semantic information from the first audio data signal and for converting said semantic information into an audio command;
an optical sensor for reading first optical data;
an optical analyzer for converting the first optical data to an optical command; and
a transmitter for transmitting at least the audio command or the optical command to the server,
the server comprising:
a communication device for receiving at least first audio data signals or the first optical data signals transmitted by said transmitter;
a memory device for storing programs to be performed; and
a CPU for receiving the audio command and the optical command, retrieving a program associated with the audio command or the optical command and for executing the retrieved program.

10. The control system of claim 9, wherein the portable device further comprises:
a receiver for receiving an audio reply from the server;
an audio synthesizer for converting the reply to second audio data; and
a speaker outputting the second audio data.

11. The control system of claim 9, wherein the server is activated when the communication device receives an on-signal from the portable device.

12. The control system of claim 9, wherein the server is coupled to at least one home component selected from the group consisting of audio/video equipment, electric appliance, computer, home automation system, fire alarm system, burglar alarm system, telephone system, intercom system, and the programs stored in said memory device control the operation of the home component.

13. The control system of claim 9, wherein the program relates to controlling a TV.

14. The control system of claim 9, wherein the program relates to executing shopping and providing payment information with an Internet shopping site.

15. The control system of claim 9, wherein the program relates to controlling a VCR.

16. The control system of claim 14, wherein the program relates to sending payment information which is stored in the memory device or input by an operator via the portable device.

17. The control system of claim 14, wherein the program relates to sending payment information stored in the memory device when a voice print of an operator input to the server via the portable device substantially matches a pre-stored voice print, which is stored in the memory device.

18. The control system of claim 14, wherein the payment information is prestored on a computer device located at the Internet shopping site.

19. The control system of claim 14, wherein the payment information includes a credit card number.

20. The control system of claim 9, wherein the program relates to browsing of Internet web-sites.

21. The control system of claim 9, wherein the program relates to translating, recording voices, searching an address book and searching a dictionary.

* * * * *